United States Patent [19]

Injeyan et al.

[11] Patent Number: 5,555,254

[45] Date of Patent: Sep. 10, 1996

[54] HIGH BRIGHTNESS SOLID-STATE LASER WITH ZIG-ZAG AMPLIFIER

[75] Inventors: Hagop Injeyan, Glendale; Randall J. St. Pierre, Santa Monica; Rodger C. Hilyard, Canyon Country; George M. Harpole, San Pedro; Carolyn S. Hoefer, Malibu, all of Calif.

[73] Assignee: TRW Inc., Redondo Beach, Calif.

[21] Appl. No.: 148,758

[22] Filed: Nov. 5, 1993

[51] Int. Cl.$^6$ ................................ H01S 3/04; H01S 3/06
[52] U.S. Cl. ............................. 372/33; 372/35; 372/66;
359/338; 359/342; 359/347
[58] Field of Search .................... 359/338, 342,
359/347; 372/35, 36, 99, 66, 68, 105, 29,
33, 106

[56] References Cited

U.S. PATENT DOCUMENTS

| | | | |
|---|---|---|---|
| 3,423,693 | 1/1969 | Chernoch et al. | 331/94.5 |
| 3,534,291 | 10/1970 | Martin et al. | 331/94.5 |
| 3,633,126 | 6/1972 | Martin et al. | 331/94.5 |
| 4,127,827 | 11/1978 | Barry | 331/94.5 |
| 4,233,571 | 11/1980 | Wang et al. | 331/94.5 |
| 4,378,601 | 3/1983 | Eggleston, III et al. | 372/66 |
| 4,408,334 | 10/1983 | Lundstrom | 372/33 |
| 4,493,085 | 1/1985 | Valley | 372/19 |

(List continued on next page.)

FOREIGN PATENT DOCUMENTS 0296512 6/1988 European Pat. Off. .

OTHER PUBLICATIONS

D. Golla, et al., "Diode laser side–pumped slab lasers," (Translation and orig.), 2412 Optics Letters, 15 (1990) Jan. 15, No. 2, Washington, D.C., US.

J. R. Leger, et al., "Geometrical Transfromation of Linear Diode–Laser Arrays for Longitudinal Pumping of Solid–State Lasers," 8106 IEEE Journal, 28 (1992) Apr., No. 4, New York, US.

J. Tajima, et al., "Performance of Composite Glass Slab Laser," IEEE Journal of Quantum Electronics, vol. 28, No. 6, Jun. 1992.

N. F. Andreev, et al., "Four–pass YAG:Nd laser amplifier with compensation for aberration and polarization distrotions of the wavefront," 2287 Soviet Journal of Quantum Electronics 22 (1992) Sept., No. 9, New York, US.

D. Eimerl, "A Novel Injection and Switchout Scheme for Multipass Laser Amplifiers," IEEE Journal of Quantum Electronics, vol. QE–23, No. 4, Apr. 1987.

*Primary Examiner*—Rodney B. Bovernick
*Assistant Examiner*—Robert McNutt

[57] ABSTRACT

A solid-state laser architecture producing a beam of extremely high quality and brightness, including a master oscillator operating in conjunction with a zig-zag amplifier, an image relaying telescope and a phase conjugation cell. One embodiment of the laser architecture compensates for birefringence that is thermally induced in the amplifier, but injects linearly polarized light into the phase conjugation cell. Another embodiment injects circularly polarized light into the phase conjugation cell and includes optical components that eliminate birefringence effects arising in a first pass through the amplifier. Optional features permit the use of a frequency doubler assembly to provide output at twice optical frequencies, and an electro-optical switch or Faraday rotator to effect polarization angle rotation if the amplifier material can only be operated at one polarization. The zig-zag amplifier is cooled by flow of cooling liquid, preferably using longitudinal flow to minimize temperature gradients in a vertical direction, and has cooling channel seals disposed in dead zones that receive no light, to minimize optical damage to the seals. Light is input to the amplifier at a near normal angle of incidence, to minimize polarization by reflection and to permit a polarizer to be used to extract an output beam from the amplifier. Antireflective coatings on edges and on sides of the amplifier eliminate parasitic oscillations, and wedge-shaped windows provide uniform pumping by eliminating gaps between diode arrays.

16 Claims, 7 Drawing Sheets

U.S. PATENT DOCUMENTS

| | | | |
|---|---|---|---|
| 4,555,786 | 11/1985 | Byer | 372/70 |
| 4,682,340 | 7/1987 | Dave et al. | 372/108 |
| 4,709,368 | 11/1987 | Fukuda et al. | 372/10 |
| 4,725,787 | 2/1988 | Chandra | 359/338 |
| 4,730,324 | 3/1988 | Azad | 372/33 |
| 4,734,911 | 3/1988 | Bruesselbach | 372/21 |
| 4,794,344 | 12/1988 | Johnson | 359/338 |
| 4,833,682 | 5/1989 | Byer et al. | 372/34 |
| 4,852,109 | 7/1989 | Kuchar | 372/35 |
| 4,875,219 | 10/1989 | Russell | 372/92 |
| 4,881,233 | 11/1989 | Hans-Peter von Arb et al. | 372/35 |
| 4,902,980 | 2/1990 | O'Meara | 330/4.3 |
| 4,918,703 | 4/1990 | Kukla | 372/66 |
| 4,949,346 | 8/1990 | Kuper et al. | 372/36 |
| 4,954,246 | 1/1991 | Cabaret et al. | 372/35 |
| 4,989,216 | 1/1991 | Chandra et al. | 372/97 |
| 4,991,177 | 2/1991 | Chang et al. | 372/21 |
| 5,034,627 | 7/1991 | Ayral et al. | 307/426 |
| 5,034,950 | 7/1991 | Jackel et al. | 372/21 |
| 5,050,175 | 9/1991 | Ayral et al. | 372/21 |
| 5,228,051 | 7/1993 | Matthews | 372/108 |
| 5,335,237 | 8/1994 | Zapata | 372/33 |

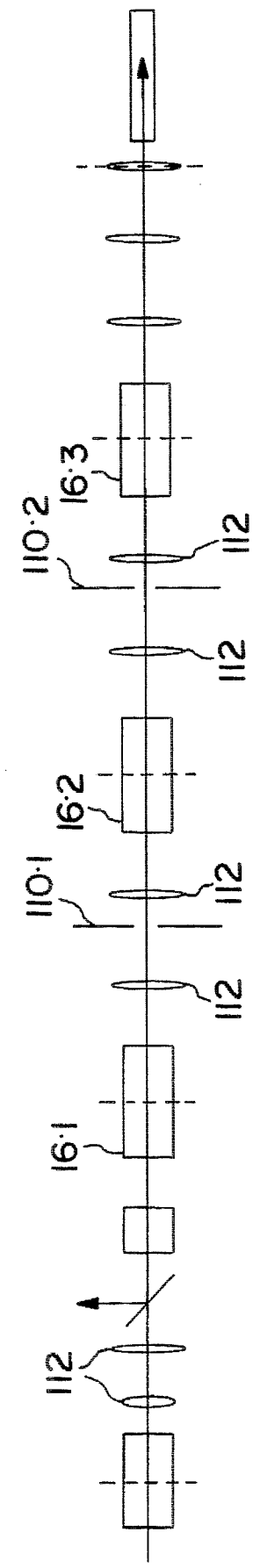

HIGH BRIGHTNESS SOLID-STATE LASER WITH ZIG-ZAG AMPLIFIER

BACKGROUND OF THE INVENTION

This invention relates generally to high-power solid-state lasers and, more particularly, to systems for producing laser beams of extremely high brightness. Solid-state lasers with an average power up to 100 W (watts), and even higher powers, are needed in a variety of military, industrial and commercial applications, including X-ray photolithography, laser machining and drilling, space and underwater communication, and medical applications.

The brightness of a laser beam is proportional to the average power and is inversely proportional to the square of the beam quality, where the beam quality is in turn defined in relation to a diffraction-limited beam, i.e., a diffraction-limited beam has an ideal beam quality of 1.0. A worse beam quality of, say, 1.5 results in a brightness of $1/(1.5)^2$ or 44.4% of the brightness of the diffraction limited beam. Since the brightness falls off in proportion to the square of the beam quality, it is extremely important to control the beam quality if high brightness is a design goal.

A number of laser architectures disclosed in various prior patents use a phase conjugated master oscillator power amplifier (PC MOPA) configuration, but still fail to produce a desirably bright beam, or have other drawbacks. Accordingly, there is still a significant need for an improved solid-state laser architecture providing excellent beam quality and, therefore, an extremely bright beam. The present invention satisfies this need, as outlined in the following summary.

SUMMARY OF THE INVENTION

The present invention resides in a high brightness solid-state laser source, comprising a master oscillator, generating a pulsed beam having a nearly diffraction limited beam quality; a zig-zag slab amplifier positioned to receive and amplify the beam from the master oscillator, during a first pass through the amplifier; a phase conjugation cell positioned to receive the amplified beam from the zig-zag slab amplifier and to reflect the beam in phase conjugated form back into the zig-zag slab amplifier for a second pass, whereby aberrations introduced in the zig-zag slab amplifier during the first pass are practically canceled during the second pass; and means for extracting an amplified beam after the second pass through the amplifier, whereby the extracted amplified beam has high beam quality and extremely high brightness. The beam produced has both high beam quality and high brightness, with average beam powers up to 100 watts or more.

In one preferred embodiment of the invention, the means for extracting an amplified beam includes a quarter-wave plate positioned between the zig-zag amplifier and the phase conjugation cell, to effect a rotation in polarization angle in the light beam input to the amplifier in the second pass; and a polarizer positioned between the master oscillator and the zig-zag amplifier. The polarizer transmits light from the master oscillator to the amplifier, and outcouples the orthogonally polarized return beam from the amplifier.

Alternatively, the means for extracting an amplified beam includes a polarizer positioned at the output of the master oscillator; and means positioned between the polarizer and the amplifier, for rotating the polarization angle of the return beam from the amplifier. As in the first-mentioned embodiment, the polarizer transmits light from the master oscillator to the amplifier and outcouples the differently polarized return beam from the amplifier.

In another variant of the invention, the means for extracting an amplified beam includes a frequency doubler assembly positioned between the master oscillator and the zigozag amplifier, to effect outcoupling of optical light from the source.

In yet another embodiment of the invention, a quarter-wave plate is not used in conjunction with the phase conjugation cell. Instead, a Faraday rotator positioned adjacent to the phase conjugation cell rotates the polarization angle of both the input beam and the return beam by 45°, to produce an orthogonally polarized output beam that can be extracted using a polarizer. The Faraday rotator also serves to facilitate removal of birefringence effects arising in the amplifier. The only drawback of this embodiment is that linearly polarized light is injected into the phase conjugation cell, which may not then operate at desirably high energy levels.

Yet another embodiment of the invention also uses a quarter-wave plate, to provide circularly polarized light to the phase conjugation cell, but also includes means for eliminating birefringence resulting from the first pass through the amplifier. The means for eliminating first-pass birefringence includes first polarization-sensitive means located between the amplifier and the quarter-wave plate, for transmitting a principal component of the amplified input beam along a first optical path, and simultaneously reflecting an orthogonal birefringence component of the amplified input beam along a second optical path; optical means located in the first optical path, for rotating the polarization angle of the principal component by 90°; means located in the second optical path, for transmitting light in the forward direction without change in the polarization angle, and for rotating the polarization angle 90° for light traversing the second optical path in the return direction, whereby the birefringence component of the input beam traverses the second optical path unaffected; and second polarization-sensitive means, located at a junction of the first and second optical paths, wherein the principal component of the input beam is reflected from the first optical path into the quarter-wave plate, the birefringence component is reflected into space and discarded, and the return beam from the quarter-wave plate is transmitted back along the second optical path. The return beam is subjected to a 90° rotation in polarization angle by the optical means in the second optical path, and is reflected by the first polarization-sensitive means back toward the amplifier.

More specifically, the first and second polarization-sensitive means are polarizers that reflect light that is linearly polarized in one direction and transmit light that is linearly polarized in an orthogonal direction. In the illustrative embodiment, each of the first and second optical paths also includes a mirror.

The invention may also be defined in terms of a method for eliminating birefringence effects introduced in a first pass of an input light beam through an optical amplifier. The method comprises the steps of separating the amplified input beam into a principal component and a birefringence component having first and second orthogonal linear polarization angles; rotating the polarization direction of the principal component by 90°, such that it also has the second polarization angle; directing the birefringence component and the polarization-rotated principal component onto a polarization-sensitive reflector, wherein the birefringence component is reflected into space and discarded and the principal component is reflected into a quarter-wave plate; converting the linearly polarized principal component into circularly polarized light; reflecting the circularly polarized light from a phase conjugation cell and back through the quarter-wave plate; converting the circularly polarized reflected beam into linearly polarized light having the first polarization angle; transmitting the return beam through the polarization-sensitive reflector and along the second optical path; rotating the polarization angle of the return beam using an optical component in the second optical path that had no effect on the input beam; reflecting the return beam back into the amplifier, without any birefringence component and with the second polarization angle; and extracting the return beam as an output beam, using another polarization-sensitive reflector.

The present invention also resides in a zigozag slab amplifier including a slab of solid-state laser material, the slab having two opposing sidewalls from which a light beam is repeatedly reflected as it progresses longitudinally through the amplifier, and two opposing vertical end walls, oriented to allow input of a light beam at an angle practically normal to the end walls, whereby input of light at a near normal angle of incidence provides low-loss injection independent of beam polarization. The amplifier also has at least one diode array positioned in close proximity to at least one of the sidewalls, to provide power to the amplifier; and means for cooling the sidewalls by flowing a liquid in contact with the sidewalls.

The means for cooling the sidewalls includes means for flowing the liquid in a longitudinal direction past the sidewalls, to minimize temperature gradients in a vertical direction. The means for flowing the liquid in a longitudinal direction includes a transparent window positioned adjacent to and parallel to each sidewall, forming a channel for the flow of cooling liquid; and a seal between the transparent window and the sidewall, the seal having transverse segments positioned on the sidewall in dead zones on which no light falls. The angle of incidence of light internally on each sidewall is selected in relation to the beam width to form the dead zones. Preferably, the transparent windows are wedge-shaped, to compensate for gaps between arrays of diodes and provide a more uniform pumping action in the vertical vertical direction.

The slab further includes antireflective coatings on its end walls and on sidewall portions on which the input light beam first impinges, whereby parasitic light rays approximately parallel with the longitudinal direction are suppressed by the antireflective coatings. In accordance with another feature of the invention, the zig-zag amplifier further comprises thermal control means positioned at upper and lower edge faces of the amplifier slab, to improve temperature gradients in the vertical direction, and antireflective coatings on the upper and lower edge faces, to suppress parasitic light rays having a vertical component.

It will be appreciated from the foregoing that the present invention represents a significant advance in the field of high brightness laser sources of moderate to high power. Additional aspects and advantages of the invention will become apparent from the following more detailed description, taken in conjunction with the accompanying drawings.

BRIEF DESCRIPTION OF THE DRAWINGS

FIG. 2b is a top view of the master oscillator rod assembly of FIG. 2a;

FIG. 9 is an alternative embodiment of the invention using image relaying telescopes and multiple amplifiers.

DESCRIPTION OF THE PREFERRED EMBODIMENT

Figure 1:
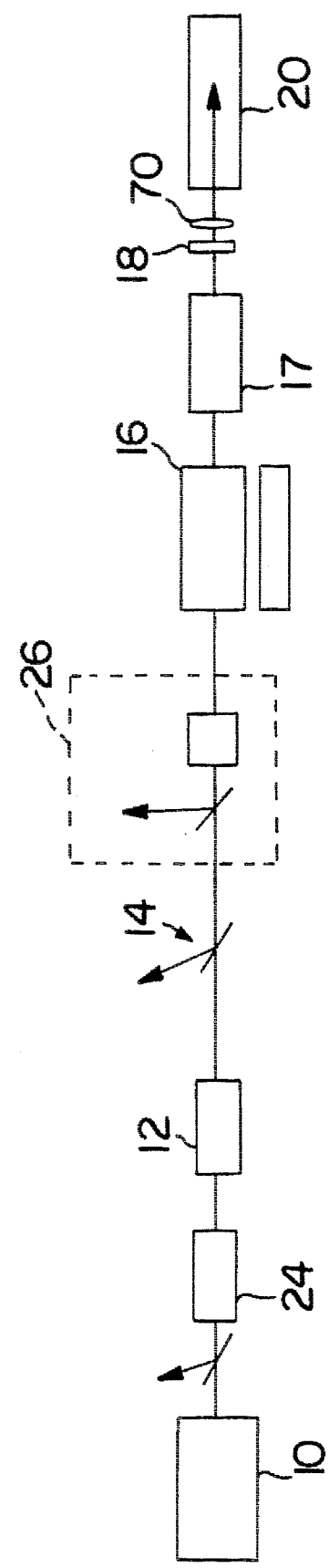
FIG. 1 is an optical schematic diagram of a phase conjugated master oscillator power amplifier (PC MOPA) configuration embodying the principles of the present invention.

As shown in the drawings for purposes of illustration, the present invention pertains to a solid-state laser architecture for generating a laser beam of moderate to high power and extremely high brightness, and to a related laser amplifier structure. Although the phase-conjugated master oscillator power amplifier (PC MOPA) configuration has been used in many variations, all have to date suffered from less than outstanding beam quality and, therefore, diminished brightness levels.

In accordance with one aspect of the present invention, a MOPA configuration uses a zig-zig amplifier and provides a beam of extremely high quality, approximately 1.1 times the diffraction limit, and a correspondingly high brightness. The brightness is defined as:

$$Brightness = \frac{P_{ave}}{4\pi\lambda^2(BQ)^2}$$

where:

$P_{ave}$=average beam power, $\lambda$=wavelength, and

BQ=beam quality.

The overall architecture is shown in FIG. 1 as including a master oscillator, indicated by reference numeral 10, a beam shaping telescope 12, a polarizer 14, a zig-zag amplifier 16, an image relaying telescope 17, a quarter-wave plate 18, and a phase conjugation mirror 20. The image relaying telescope 17 includes a pair of lenses in an afocal configuration (as better shown at 112 in the embodiment of FIG. 9), and functions to eliminate the effects of diffraction from hard apertures, such as the amplifier 16. The image relaying telescope 17 also maintains beam uniformity. The master oscillator 10, which operates in conjunction with a Faraday isolator 24, produces a high quality, low energy optical beam of insufficient power for many purposes. The master oscillator beam is first passed through the beam shaping telescope 12, to further condition the beam, and enters the zig-zag amplifier 16. The amplifier 16, which may consist of a string of amplifiers, amplifies the beam on its first pass and the beam then is image relayed onto the phase conjugation mirror 20. Almost certainly, the amplifier causes phase aberrations in optical wavefronts of the beam as it passes through the amplifier medium. However, as is well known, phase conjugation may be used to cancel these aberrations by passing a phase-conjugated form of the beam back through the amplifier.

Extraction of an output beam from the architecture shown in FIG. 1 is effected by means of the quarter-wave plate 18 and the polarizer 14. The quarter-wave plate rotates the polarization angle of the beam by means of two passes through the plate. More specifically, on the first pass through the quarter-wave plate 18 the linear polarization of the beam is converted to circular polarization. On the return pass, the circularly polarized beam is converted back to linearly polarized light, but with a polarization direction orthogonal to that of the original beam. Since the amplified beam leaving the amplifier 16 on the return pass has an orthogonal polarization with respect to the beam that was input to the amplifier, the polarizer 14 can be used to extract the output beam. An alternative extraction scheme uses an optional frequency doubling assembly 26, which extracts green light in the visible portion of the spectrum.

Figure 4:
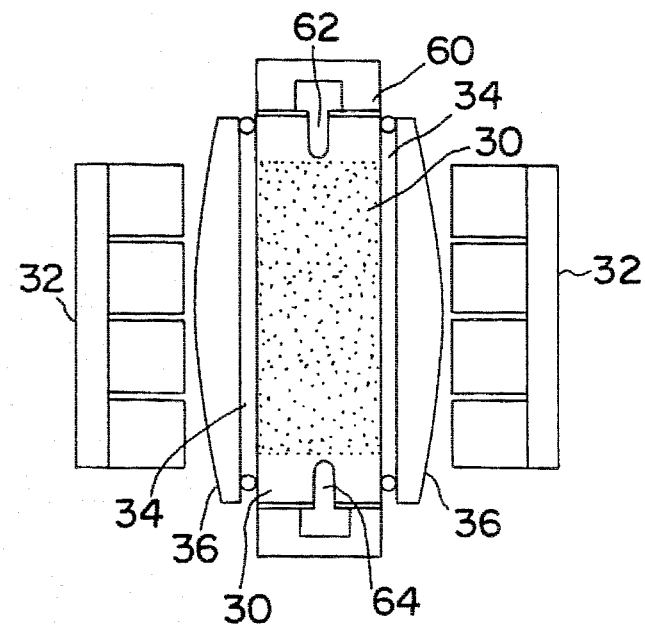
FIG. 4 is an end view of a laser head (amplifier) in accordance with the invention.
Figure 4A:
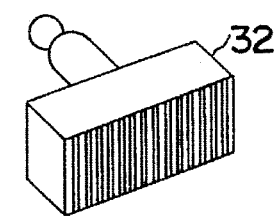
FIG. 4a is a perspective view of a diode array module used in the laser head of FIG. 4.
Figure 5:
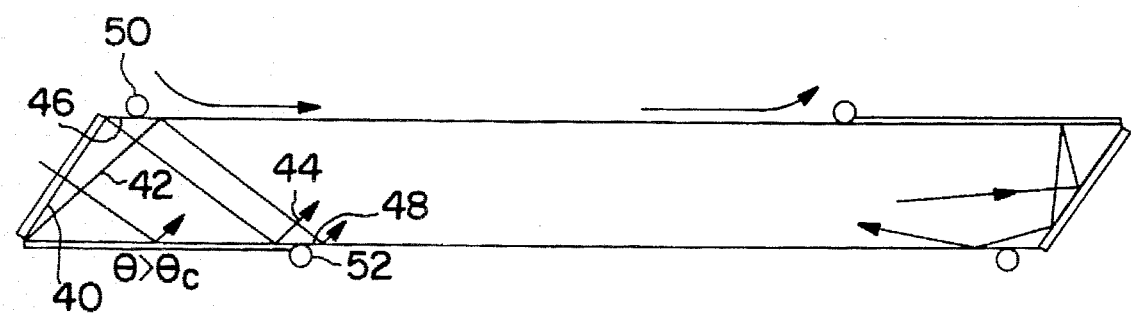
FIG. 5 is a fragmentary top view of a zig-zag amplifier used in the configuration of FIG. 1.

Another important aspect of the invention is the zig-zag amplifier 16. Although amplifiers of this type have been known for some years they have inherently not been able to provide exceptionally good beam quality. One reason for this is the temperature gradients that develop during operation of the amplifier. As shown in FIGS. 4, 4a and 5, a zig-zag amplifier consists of a slab of a material, such as yttrium-aluminum-garnet crystal (YAG), through which a light beam is passed, by repeated reflections from opposite sidewalls of the slab. A portion of the slab is indicated by reference numeral 30. In conventional zig-zag amplifiers, an input beam impinges on an edge face of the slab at an angle selected to permit the beam to refract toward its first reflection point on a sidewall. Arrays of diodes, as indicated at 32, are disposed on opposite sides of the slab 30 and provide the energy for the amplification process. This optical pumping process also causes uneven heating in the slab 30. Cooling is effected by means of water channels 34 immediately adjacent to the sidewalls of the slab, and formed between the sidewalls and wedge-shaped windows 36 of sapphire or similar material. Prior to the present invention, cooling water was pumped in a direction perpendicular to the direction of progression of the beam through the amplifier, i.e. along the shorter or height dimension of the sidewalls.

In accordance with one aspect of the present invention, cooling water is flowed longitudinally, i.e. along the longer dimension of the slab 30, as indicated by the arrows in FIG. 5, to minimize temperature gradients along the height dimension. The zig-zag path of the beam, as it progresses along the longitudinal direction, tends to average out temperature effects in the transverse direction.

In accordance with another important aspect of the invention, the beam is launched into the amplifier at a near normal (i.e. perpendicular) angle of incidence. This minimizes polarization caused by external reflection from the slab edge and therefore permits the use of the quarter-wave plate 18 and the polarizer 14 to extract the amplified beam from the apparatus. As best shown in FIG. 5, an edge face 40 of the slab 30 is formed at non-perpendicular angle to the sidewalls of the slab. The acute angle between the edge face 40 and the sidewall is selected so that the angle the beam makes with the normal to the sidewall is greater than the critical angle of incidence for internal reflection from the sidewalls. Therefore, the light beam will be launched into the amplifier slab 30 with little or no refraction, and will be first reflected by a sidewall, as indicated by the beam paths 42 and 44. The paths 42 and 44, which represent the outside edges of the beam, progress along the slab 30 by making multiple reflections from the sidewalls. It will be observed from FIG. 5 that the initial angle of incidence on a sidewall is chosen in relation to the slab thickness such that there will be shadow stripes formed at regular intervals along each sidewall. For example, the shadow stripes 46 and 48 are dead zones on which no portion of the beam impinges. The return path through the amplifier exactly traces the beam path during its first pass, so the dead zones are preserved after the second pass.

In accordance with another important aspect of the invention, selected shadowed dead zones are used as the locations of segments of a pair of water seals, indicated at 50 and 52. Each seal is an O-ring or similar configuration, and is positioned between the slab 30 and the wedge-shaped windows 36. Each of the seals 50 and 52 follows an approximately rectangular path, having longitudinal segments, shown in FIG. 4, and transverse segments, shown in FIG. 5, with appropriate openings (not shown) to provide for flow of water into and out of the channels 34. The importance of the location of the transverse segments has to do with the durability of the seals when exposed to optical damage by intense light. The longitudinal segments can be conveniently located above and below the active region of the amplifier, but the location of the transverse segments presents a problem since the beam impinges repeatedly on the sidewalls of the slab 30. However, the invention provides a solution to the problem by locating the transverse segments of the seals 50 and 52 in the deliberately shadowed dead zones, such as 46 and 48. Therefore, the entire length of each of the seals 50 and 52 is located in a region that is permanently shaded from the light beam, and optical damage to the interface between the slab 30 and the seals 50 and 52 is virtually eliminated.

Another important aspect of the invention resides in the use of the wedge-shaped windows 36 between the diode arrays 32 and the amplifier slab 30. In addition to functioning as transparent outer walls of the water channels 34, the windows also provide optical compensation for the gaps between the diode arrays 32, to give a more uniform pumping action in the vertical direction.

One of the difficulties of operation of zig-zag amplifiers arises from the presence of "parasitics," in the form of light that takes an unintended path and interferes with the operation of the amplifier. For example, parasitic rays that are approximately longitudinal may be reflected from an end face of the slab 30 and impinge normally on a sidewall of the slab. This could give rise to a lasing effect in the amplifiers, with light being repeatedly reflected back and forth perpendicularly between the sidewalls. To minimize this type of parasitic effect, the amplifier of the invention includes an antireflective coating on the end faces of the amplifier slab 30 and on a region of the sidewall where the beam first impinges, between the end wall and the seal 52.

Another type of parasitic problem arises from rays that make repeated reflections between opposite upper and lower edge faces of the slab 30. As shown in FIG. 4, parasitics of this type are suppressed by another antireflective coating 60 applied to the upper and lower edge faces. The coating 60 may be copper oxide or black paint.

The amplifier structure also includes means for controlling temperature at the upper and lower edge faces of the slab 30. Each of the upper and lower edge faces of the slab 30 has a temperature control slot (62, 64) extending vertically into the slab and extending horizontally along its length. Temperature in the slots 62, 64 is controlled either by the use of a liquid flowing in the slots, or by use of a heater bar embedded in a conductive medium in or near the slots. One of these mechanisms is used to control the temperature profile in a vertical direction, to allow the profile in the unpumped region of the slab to approximate that in the pumped region.

The phase conjugation cell 20 is a conventional stimulated Brillouin scattering (SBS) cell, using a suitable SBS medium, such as liquid freon 113 or gaseous nitrogen. As is well known, the SBS process reverses the wavefront of an input beam. (Portions of the wavefront that were lagging become leading, and vice versa.) Aberrations impressed on the wavefront during the first pass through the amplifier 16 are, therefore, negated and virtually removed during the second pass after reflection from the phase conjugation cell 20. Of course, this technique eliminates the aberrations only if there have been no significant changes in the aberrating medium, i.e. the amplifier slab 30, between the first and second passes. Aberrations introduced in the amplifier are caused principally by temperature gradients, which change relatively slowly and are, therefore, effectively eliminated by the phase conjugation scheme.

Figure 6:
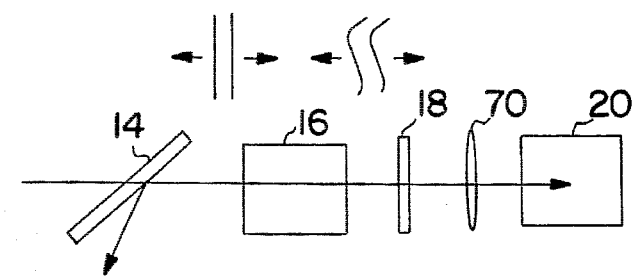
FIG. 6 is a schematic diagram illustrating operation of a phase conjugation cell.

The phase conjugation principle is illustrated diagrammatically in FIG. 6. The beam generated by the master oscillator 10 and transmitted by the polarizer 14 is shown as having an ideal wavefront, which is aberrated by the amplifier 16. After the first pass through the amplifier 16, the beam passes through the quarter-wave plate 18 and is focused into the SBS cell 20 by a suitable lens 70. After reflection and phase conjugation, the beam is still aberrated, but in an opposite phase sense, so the aberrations are canceled in the amplifier 16, and the aberration-free beam is extracted from the apparatus by means of the polarizer 14.

Figure 7A:
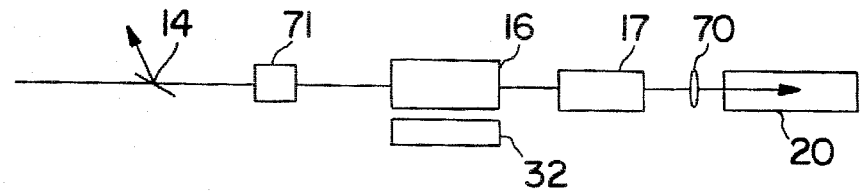
FIGS. 7a, 7b and 7c are optical schematic diagrams showing three alternative techniques for extracting energy from the laser configuration of the invention.
Figure 7B:
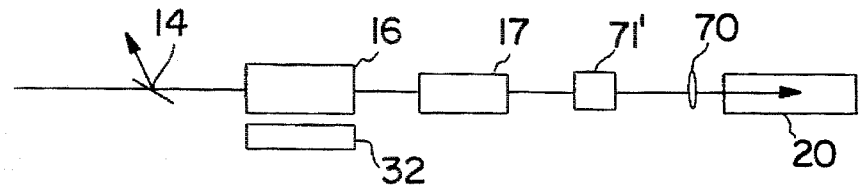
Figure 7C:
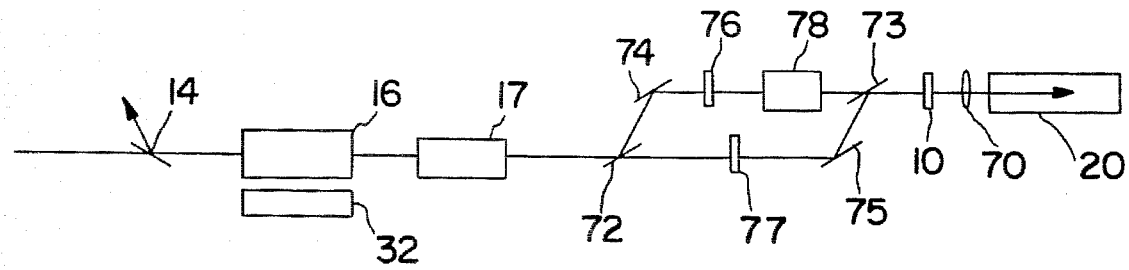

FIGS. 7a, 7b and 7c show alternative techniques for extracting an output beam from the apparatus of the invention. As already discussed, the preferred approach is to use the quarter-wave plate 18 in conjunction with the polarizer 14. However, if this approach cannot be used, perhaps because the amplifier uses a birefringent crystal that will operate effectively in only one polarization mode, then an alternative extraction technique can be used. Instead of the quarter-wave plate 18, the apparatus includes an electro-optical (EO) switch or Faraday rotator 71, positioned immediately downstream of the polarizer 14. Basically, the switch or rotator 71 rotates the polarization angle of only the return beam, i.e. the beam emerging from the amplifier on the second pass. If an EO switch is used, its operation is timed such that the switch is activated only when a return pulse of the beam is expected. During each pulse of the input beam, the switch is inactive and does not affect the beam, but the return pulse has its polarization angle rotated to be orthogonal to that of the input beam. A Faraday rotator used for the optical element 71 effects a 45° rotation of the polarization angle of both the input beam and the return beam. Therefore, the return beam has an orthogonal polarization with respect to the input beam. and the polarizer operates as before to extract the output beam.

In circumstances where there is significant thermally induced birefringence in the gain medium, it is desirable to eliminate or reduce the birefringence, since birefringence results in loss upon outcoupling and can damage the master oscillator 10 and the beam shaping optics 12. By replacing the quarter wave plate 18 with a Faraday rotator 71' (FIG. 7b) the birefringence that is accumulated on the first pass through the gain medium is corrected on the return pass, restoring the polarization purity of the beam. The Faraday rotator 71' rotates the polarization angle a total of 90°, which not only cancels the effects of any birefringence in the amplifier 16, but also permits outcoupling through the polarizer 14.

Under the FIG. 7b configuration, the light injected into the SBS cell 20 is mostly linearly polarized light. Some SBS media, such as liquids, have a much lower optical breakdown threshold for linearly polarized light than for circularly polarized light, which is the case when a quarter wave plate is used. A low breakdown threshold limits the range of energies over which the SBS cell 20 can be used, so that the goal of high output energy and brightness may not be attained.

In cases where high energies are required, it would be preferable to use circularly polarized light in the SBS cell 20, as provided by the quarter-wave plate 18 in the FIG. 1 configuration, but to provide in addition a technique for substantially reducing the effects of thermally induced birefringence in the amplifier gain medium. For this purpose, an alternative extraction method can be used to reduce the birefringence by a factor of two, by restoring the polarization purity of the beam at the SBS cell 20.

FIG. 7c shows an optical configuration that removes orthogonally polarized light arising from birefringence, using a combination of two polarizers 72, 73, two mirrors 74, 75, two half-wave plates 76, 77, and a Faraday rotator 78. Light from the amplifier 16 and the image relay telescope 17 may be considered to contain two components: one linearly polarized component derived from the input beam and not affected by birefringence in the amplifier, and a smaller component that is linearly polarized at an orthogonal angle, due to the birefringence effects. The light from the image relay telescope 17 impinges first on polarizer 72, which passes the first component, probably amounting to, e.g., 90% or more of the light, and reflects the orthogonally polarized component caused by birefringence. For purposes of explanation, suppose that the input light beam, i.e. the principal component transmitted by the polarizer 72, is horizontally polarized and the birefringence component reflected by the polarizer 72 is vertically polarized. The vertically polarized light component is reflected by mirror 74, passes through passive half-wave plate 76 and Faraday rotator 78, and is "dumped" by reflection from the other polarizer 73. In the forward direction (to the right as illustrated), the combination of the half-wave plate 76 and the Faraday rotator 78 produce canceling rotations of the polarization angle. Therefore, the birefringence component remains vertically polarized and is reflected by the polarizer 73.

The principal or horizontally polarized beam has its polarization angle changed to vertical by the lower half-wave plate 77, is next reflected by mirror 75 and is reflected again by polarizer 73. Then the main beam is converted to circularly polarized light by the quarter-wave plate 18, and enters the SBS cell 20. Upon reflection from the SBS cell 20, the main beam is converted to horizontally polarized light by the quarter-wave plate 18 and is then transmitted by the polarizer 73. On its return path, the principal beam component encounters the Faraday rotator 78 and the other half-wave plate 76, and in this direction these two components combine to produce a 90° rotation in the polarization angle. Therefore, the principal beam becomes vertically polarized, and is reflected from the mirror 74 and the polarizer 72.

Therefore, the beam returned to the amplifier 16 is orthogonally polarized with respect to the input beam, and has had any birefringence component removed. In the return pass through the amplifier 16, the polarization will be rendered less "pure" again by the birefringence effect, but the configuration of FIG. 7c achieves a 50% reduction in birefringence. If, for example, the birefringence component is as high as 10% for each amplifier pass, the invention reduces the overall effect of birefringence from 20% to 10%.

Figure 2A:
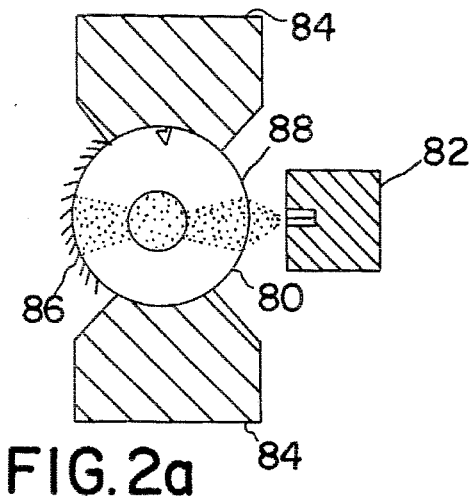
FIG. 2a is an end view of a master oscillator rod assembly used in the configuration of FIG. 1.
Figure 2B:
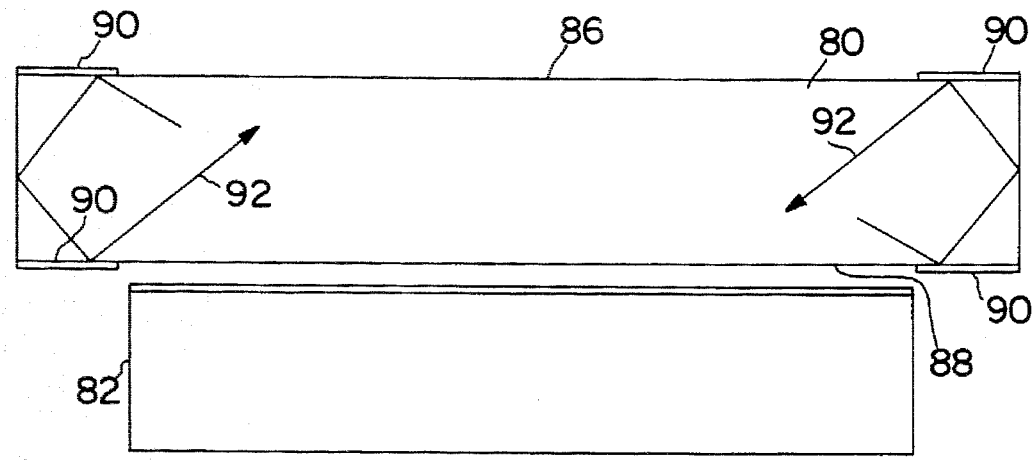
Figure 3:
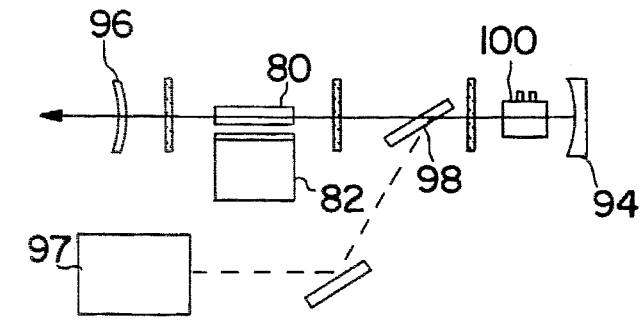
FIG. 3 is an optical schematic diagram of a master oscillator resonator used in the configuration of FIG. 1.

The master oscillator 22 may be of any suitable design that produces a near diffraction limited pulse output, but the preferred embodiment is shown in FIGS. 2a, 2b and 3. The master oscillator gain medium is a yttrium-aluminum-garnet (YAG) rod 80, which is side pumped by two-dimensional diode arrays 82, and has rod heat sinks 84 disposed above and below the rod. The rod 80 has a highly reflective (HR) coating 86 on its cylindrical surface opposite the diode arrays 82, and has an antireflective (AR) coating 88 on the opposite surface, adjacent to the diode arrays. There is also a parasitic suppression coating 90 to suppress off-axis parasitics, such as those indicated at 92. As indicated in the optical layout for the master oscillator (FIG. 3), the master oscillator is disposed in a resonator cavity defined by a total reflector 94 and an outcoupler 96. The resonator is injection seeded from a seed laser 97, and is Q-switched by means of a polarizer 98 and a Pockels cell 100, to provide output pulses at a desired rate. The configuration outputs a near diffraction limited Q-switched pulse with excellent temporal, amplitude and directional stability.

Figure 8:
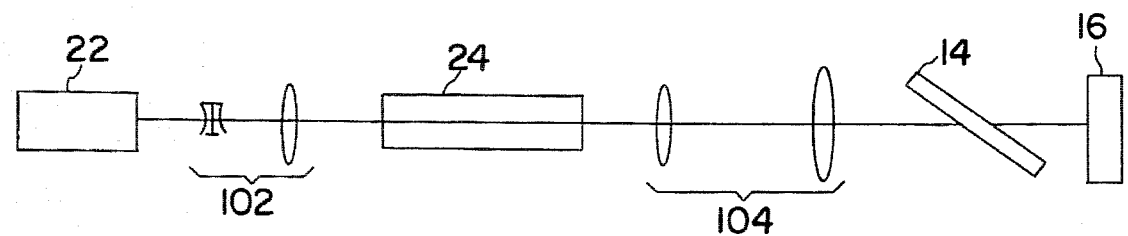
FIG. 8 is an optical schematic showing a preferred configuration for beam shaping in the master oscillator of the invention.

As shown in FIG. 8, beam shaping (12) is effected by the Faraday isolator 24 and one or more telescopes 102, 104. The Faraday isolator 24 protects the master oscillator 22 from energy leaking through the polarizer 14 due to birefringence in the amplifier 16. Thus, in the configuration of FIG. 7c, the Faraday oscillator 24 serves to remove birefringence components introduced during the return pass of the beam through the amplifier 16. The telescopes 102, 104 magnify the master oscillator beam so that a uniform beam can be injected into the amplifier 16.

FIG. 9 shows how the invention can be implemented using well known image relaying principles and multiple amplifiers 16.1, 16.2 and 16.3. Spatial filters 110.1 and 110.2 are disposed between adjacent amplifier stages have oversized apertures (20 to 100 times the diffraction limit) and function to eliminate amplified spontaneous emission (ASE) and parasitic oscillations between amplifiers. Afocal image relaying telescopes, indicated by lenses 112, propagate the beam between stages and function to eliminate the effects of diffraction from hard apertures such as the amplifiers. They also improve coupling efficiency between the amplifiers and maintain beam uniformity. The configuration of FIG. 9 illustrates a more practical embodiment of the invention but is not intended to be limiting.

Figure 10:
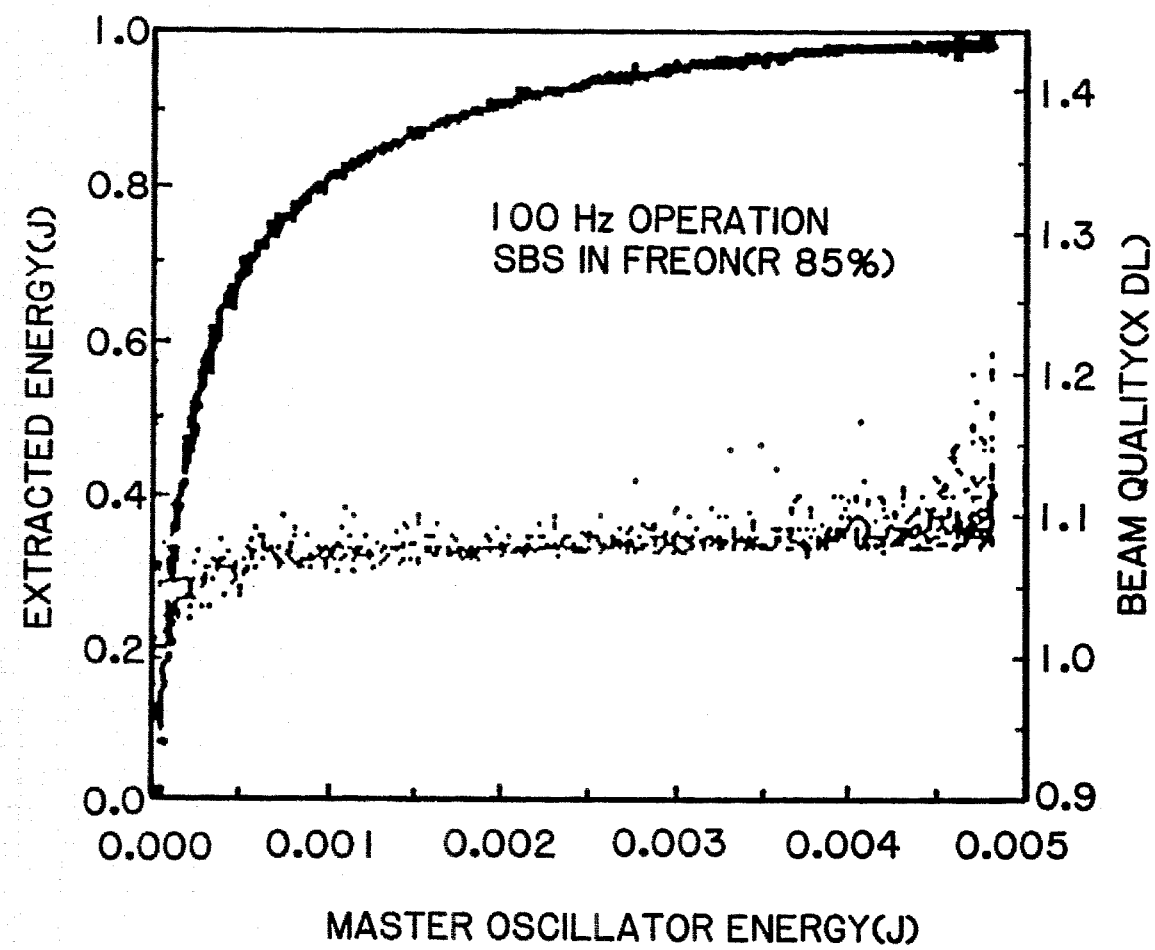
FIG. 10 is a graph showing the variation of extracted energy and beam quality, respectively, with master oscillator energy.

FIG. 10 is a graph illustrating the performance of the apparatus of the invention. In particular, the graph shows the variation of extracted energy and beam quality with the master oscillator energy. The beam quality is relatively constant at 1.1 times the diffraction limit, over a wide range of master oscillator energy levels. Average powers of up to 100 watts were recorded with this beam quality, providing an extremely bright beam of high quality.

It will be appreciated from the foregoing that the present invention represents a significant advance in the field of high brightness lasers, and also in the field of zig-zag amplifiers. In particular, the invention provides a laser architecture with extremely high brightness and high beam quality, and a zig-zag amplifier without the drawbacks of other amplifiers of the prior art. It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. A high brightness solid-state laser source, comprising:

a master oscillator, generating a pulsed input beam having a nearly diffraction limited beam quality;

a zig-zag slab amplifier positioned to receive and amplify the beam from the master oscillator, during a first pass through the amplifier;

an image relaying telescope positioned downstream of the amplifier, as seen by the input beam;

a phase conjugation cell positioned to receive the amplified input beam from the zig-zag slab amplifier and to reflect the beam in phase conjugated form back into the zig-zag slab amplifier for a second pass, whereby aberrations introduced in the zig-zag slab amplifier during the first pass are practically canceled during the second pass;

means for extracting an amplified beam after the second pass through the amplifier, whereby the extracted amplified beam has high beam quality and extremely high brightness;

a quarter-wave plate positioned adjacent to the phase conjugation cell, to convert linearly polarized light of the input beam to circularly polarized light for more effective use in the phase conjugation cell, and to convert circularly polarized light reflected from the phase conjugation cell into orthogonally polarized linear light for the return beam; and means for reducing the effect of birefringence introduced in the zig-zag amplifier;

and wherein the means for extracting the amplified beam includes a polarizer to outcouple the orthogonally polarized return beam.

2. A high brightness solid-state laser source as defined in claim 1, wherein the means for reducing the effect of birefringence includes:

means for removing any birefringence-caused component of the amplified input beam, transmitting a principal component of the amplified input beam to the quarter-wave plate, and transmitting a reflected beam back to the amplifier with a polarization angle orthogonal to that of the principal component of the input beam.

3. A high brightness solid-state laser source as defined in claim 1, wherein the mans for reducing the effect of birefringence includes:

first polarization-sensitive means located between the zig-zag amplifier and the quarter-wave plate, for transmitting a principal component of the amplified input beam along a first optical path, and simultaneously reflecting an orthogonal birefringence component of the amplified input beam along a second optical path;

optical means located in the first optical path, for rotating the polarization angle of the principal component by 90°;

means located in the second optical path, for transmitting light in the forward direction without change in the polarization angle, and for rotating the polarization angle 90° for light traversing the second optical path in the return direction, whereby the birefringence component of the input beam traverses the second optical path unaffected; and second polarization-sensitive means, located at a junction of the first and second optical paths, wherein the principal component of the input beam is reflected from the first optical path into the quarter-wave plate, the birefringence component is reflected into space and discarded, and the return beam from the quarter-wave plate is transmitted back along the second optical path;

and wherein the return beam is subjected to a 90° rotation in polarization angle by the optical means in the second optical path, and is reflected by the first polarization-sensitive means back toward the amplifier.

4. A high brightness solid-state laser source as defined in claim 3, wherein:

the first and second polarization-sensitive means are polarizers that reflect light that is linearly polarized in one direction and transmit light that is linearly polarized in an orthogonal direction.

5. A high brightness solid-state laser source as defined in claim 3, wherein:

each of the first and second optical paths includes a mirror.

6. A high brightness solid-state laser source as defined in claim 1, wherein the zig-zag amplifier further comprises:

thermal control bars positioned at upper and lower edge faces of the amplifier slab, to improve temperature gradients in the vertical direction; and antireflective coatings on the upper and lower edge faces, to suppress parasitic light rays having a vertical component.

7. A high brightness solid-state laser source as defined in claim 1, wherein the zig-zag slab amplifier includes:

a slab of solid-state laser material, the slab having two opposing sidewalls from which a light beam is repeatedly reflected as it progresses longitudinally through the amplifier, and two opposing vertical end walls, oriented to receive the pulsed input beam at an angle approximately normal to the end walls, whereby input of light at a near normal angle of incidence minimizes polarization dependent reflection from the end walls;

at least one diode array positioned in close proximity to at least one of the sidewalls, to provide power to the amplifier; and means for cooling the sidewalls by flowing a liquid in contact with the sidewalls.

8. A high brightness solid-state laser source as defined in claim 7, wherein:

the means for cooling the sidewalls includes means for flowing the liquid in a longitudinal direction past the sidewalls, to minimize temperature gradients in a vertical direction.

9. A high brightness solid-state laser source, comprising:

a master oscillator, generating a pulsed input beam having a nearly diffraction limited beam quality;

a zig-zag slab amplifier positioned to receive and amplify the beam from the master oscillator, during a first pass through the amplifier;

an image relaying telescope positioned downstream of the amplifier, as seen by the input beam:

a phase conjugation cell positioned to receive the amplified input beam from the zig-zag slab amplifier and to reflect the beam in phase conjugated form back into the zig-zag slab amplifier for a second pass, whereby aberrations introduced in the zig-zag slab amplifier during the first pass are practically canceled during the second pass; and means for extracting an amplified beam after the second pass through the amplifier, whereby the extracted amplified beam has high beam quality and extremely high brightness;

and wherein the zig-zag slab amplifier includes a slab of solid-state laser material, the slab having two opposing sidewalls from which a light beam is repeatedly reflected as it progresses longitudinally through the amplifier, and two opposing vertical end walls, oriented to receive the pulsed input beam at an angle approximately normal to the end walls, whereby input of light at a near normal angle of incidence minimizes polarization dependent reflection from the end walls:

at least one diode array positioned in close proximity to at least one of the sidewalls, to provide power to the amplifier; and means for cooling the sidewalls by flowing a liquid in contact with the sidewalls;

and wherein the means for cooling the sidewalls includes means for flowing the liquid in a longitudinal direction past the sidewalls, to minimize temperature gradients in a vertical direction, and wherein the means for flowing the liquid in a longitudinal direction includes a transparent window positioned adjacent to and parallel to each sidewall, forming a channel for the flow of cooling liquid; and a seal between the transparent window and the sidewall, the seal having transverse segments positioned in dead zones of the sidewall on which no light falls; wherein the angle of incidence of light internally on each sidewall is selected in relation to the beam width to provide dead zones on which no light falls.

10. A high brightness solid-state laser source as defined in claim 9, wherein:

the slab further includes antireflective coatings on its end walls and on sidewall portions on which the input light beam first impinges, whereby parasitic light rays approximately parallel with the longitudinal direction are suppressed by the antireflective coatings.

11. A high brightness solid-state laser source, comprising:

a master oscillator, generating a pulsed input beam having a nearly diffraction limited beam quality;

an amplifier positioned to receive and amplify the beam from the master oscillator, during a first pass through the amplifier;

a phase conjugation cell positioned to receive the amplified input beam from the amplifier and to reflect the beam in phase conjugated form back into the amplifier for a second pass, whereby aberrations introduced in the amplifier during the first pass are practically canceled during the second pass;

means for eliminating birefringence effects introduced in the first pass through the amplifier; and means for extracting an amplified beam after the second pass through the amplifier, including a quarter-wave plate positioned adjacent to the phase conjugation cell and a polarizer positioned between the master oscillator and the amplifier, whereby the quarter-wave plate ensures that circularly polarized light is input to the phase conjugation cell and that the return beam is orthogonally polarized, whereby the extracted amplified beam has high beam quality and extremely high brightness.

12. A high brightness solid-state laser source as defined in claim 11, wherein the means for eliminating birefringence effects includes:

means for removing any birefringence-caused component of the amplified input beam, transmitting a principal component of the amplified input beam to the quarter-wave plate, and transmitting a reflected beam back to the amplifier with a polarization angle orthogonal to that of the principal component of the input beam.

13. A high brightness solid-state laser source as defined in claim 11, wherein the means for eliminating the effect of birefringence includes:

first polarization-sensitive means located between the amplifier and the quarter-wave plate, for transmitting a principal component of the amplified input beam along a first optical path, and simultaneously reflecting an orthogonal birefringence component of the amplified input beam along a second optical path;

optical means located in the first optical path, for rotating the polarization angle of the principal component by 90°;

means located in the second optical path, for transmitting light in the forward direction without change in the polarization angle, and for rotating the polarization angle 90° for light traversing the second optical path in the return direction, whereby the birefringence component of the input beam traverses the second optical path unaffected; and second polarization-sensitive means, located at a junction of the first and second optical paths, wherein the principal component of the input beam is reflected from the first optical path into the quarter-wave plate, the birefringence component is reflected into space and discarded, and the return beam from the quarter-wave plate is transmitted back along the second optical path;

and wherein the return beam is subjected to a 90° rotation in polarization angle by the optical means in the second optical path, and is reflected by the first polarization-sensitive means back toward the amplifier.

14. A high brightness solid-state laser source as defined in claim 13, wherein:

the first and second polarization-sensitive means are polarizers that reflect light that is linearly polarized in one direction and transmit light that is linearly polarized in an orthogonal direction.

15. A high brightness solid-state laser source as defined in claim 13, wherein:

each of the first and second optical paths includes a mirror.

16. A high brightness solid-state laser source as defined in claim 11, wherein the means for eliminating birefringence effects includes:

a second polarizer, positioned to receive the amplified input beam from the amplifier and to separate the beam into a principal component along a first optical path and a birefringence component along a second optical path;

a half-wave plate positioned in the first optical path, to rotate the polarization angle of the principal component by 90°;

a second half-wave plate and a Faraday rotator, positioned in the second optical path and having no net effect on the polarization angle of the birefringence component; and a third polarizer, positioned to receive light from the first and second optical paths, wherein the birefringence component from the second optical path is reflected into space and discarded, and the principal component from the first optical path is reflected into the quarter-wave plate and is reflected as a return beam by the phase conjugate cell back through the quarter-wave plate;

wherein the third polarizer transmits the orthogonally polarized return beam back along the second optical path, where the Faraday rotator and the half-wave plate effect a net 90° rotation of the polarization angle, and wherein the second polarizer reflects the return beam back into the amplifier without any birefringence component.

* * * * *